(12) United States Patent
Kondo

(10) Patent No.: US 6,761,551 B2
(45) Date of Patent: Jul. 13, 2004

(54) WATERPROOFING APPARATUS FOR TERMINAL CONNECTING PORTION OF SHEATHED WIRE

(75) Inventor: Masayuki Kondo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 196 days.

(21) Appl. No.: 10/013,486

(22) Filed: Dec. 13, 2001

(65) Prior Publication Data

US 2002/0127915 A1 Sep. 12, 2002

Related U.S. Application Data

(62) Division of application No. 09/732,787, filed on Dec. 11, 2000.

(30) Foreign Application Priority Data

Dec. 9, 1999 (JP) ............................................. 11-350661

(51) Int. Cl.[7] ............................................... B29C 45/16
(52) U.S. Cl. ..................... 425/116; 425/127; 425/129.1
(58) Field of Search ................................. 425/116, 127, 425/129.1

(56) References Cited

U.S. PATENT DOCUMENTS

| 585,707 A | 7/1897 | Schwedtmann |
| 4,685,758 A | 8/1987 | Yoshida |
| 5,620,711 A * | 4/1997 | Saito ........................... 425/116 |
| 5,885,108 A | 3/1999 | Gerrans, Jr. |
| 5,971,733 A * | 10/1999 | Huang ......................... 425/116 |
| 5,993,256 A | 11/1999 | Shimojyo |
| 6,514,064 B2 * | 2/2003 | Kondo ........................ 425/116 |
| 6,592,352 B1 * | 7/2003 | Poinelli et al. ............. 425/116 |

FOREIGN PATENT DOCUMENTS

| JP | 10-289745 | 10/1998 |
| JP | 10-511716 | 11/1998 |
| JP | 11-120986 | 4/1999 |

* cited by examiner

*Primary Examiner*—Tim Heitbrink
(74) *Attorney, Agent, or Firm*—Sughrue Mion, PLLC

(57) ABSTRACT

The terminal connecting portion is covered at a rear portion with the molding resin 30 such that the covered rear portion is shaped in fusiform, and when the sheathed wire 10 is bent at this portion, the resin thereon is less peeled off. The molding part 43 of the die 40 is closed at one side with the elastic lid plates 9a, 9b opposing at an upper part and a lower part each other, and the terminal connecting portion is set to the molding part 43, and a part of the sheathed wire 10 extending rearwards from one side of the molding part 43 is elastically held by the elastic lid plates 9a, 9b upwards and downwards. The molten molding resin 30 is injected into the molding part 43 to cover almost the whole of the terminal connecting portion. Radiating fins are formed in a slope of the tapered hole in one side of the mold, said radiating fins having a plurality of parallel alternate concave grooves and convex ribs so as to improve the radiating effect of the molding resin 30 and shorten a cooling time.

3 Claims, 4 Drawing Sheets

WATERPROOFING APPARATUS FOR TERMINAL CONNECTING PORTION OF SHEATHED WIRE

This application is a division of Ser. No. 09/732,787, filed Dec. 11, 2000.

BACKGROUND OF THE INVENTION

The present invention relates to a waterproofing apparatus for a terminal connecting portion of a sheathed wire being waterproofed by resin molding.

Generally, in a case of a sheathed wire, its front end is stripped to expose conductors therein, and stripped or bare conductors are connected to an electric part or to machinery through a terminal fitting which is crimped by such as caulking. Being left to be bare as it is after crimping, a water content goes into the sheathed wire owing to capillary phenomenon. For avoiding this, the terminal connecting portion including the bare conductors is protected by various covering means for waterproofing.

For example, a grounding terminal fitting described in Japanese Patent Publication No. 10-289745A is waterproofed by covering a thermally shrinkable tube on the bare conductors of the terminal connecting portion, and heating to deposit it thereon. Further, such a technique is obviously known as a connecting plate for battery holder set forth in Japanese Patent Publication No. 11-120986A, in which the terminal connecting portion is covered with a molding resin to provide the water proofing in wiring to an electric source of an electric vehicle, said terminal connecting portion being attached under pressure with a terminal fitting on a bare conductor.

FIG. 6 is for conceptually explaining the waterproofing apparatus of the latter related art, and is a sectional side view showing a structure of a molding die composing essential parts of the apparatus.

A molding die 1 comprises an upper mold 2 and a lower mold 3, which are provided at interiors with a molding part 4 being a molding cavity, and a molten molding resin shown with arrows 6 is inject to pour into said interior from a runner channel 5 of an injecting gate. At the interior of the mold 4, bare conductors 7a stripped by peering a front end part of the sheathed wire 7 are crimped with a terminal fitting 8 by caulking, and the thus formed terminal connection is set for positioning as a whole body excepting the only front end connecting portion of a terminal fitting 8.

The sheathed wire 7 does not require the waterproofing treatment at a part having length extending rearwards from the terminal fitting 8, and so this part should be projected outside of the die. With respect to this projecting part of the sheathed wire 7, for the molten molding resin 6 not to flow out therefrom, the molding part 4 is closed at one side with an elastic lid plate 9 such as a rubber material. The elastic lid plate 9 is of upper and lower division type composed of an upper part 9a and a lower part 9b, and the sheathed wire 7 of a part around said projection is elastically held vertically.

However, the elastic lid plate 9 serves to stop the molding resin 6 flowing out, and at the same time serves to hold the sheathed wire 7 to press it down, but being the rubber material, the following problems are present.

One of them is that when injecting to pour the molding resin 6, if a resin pouring force acts on the interior of the molding part 4, the elastic lid plate 9 is pressed from the inside due to the resin pouring force and is elastically deformed. Especially, as in FIG. 6, the elastic deformation is large on the upper part 9a of the plate 9, so that a part 9c of the plate 9 closely attaching the outer circumference of the sheathed wire 7 is pushed outside from the inside. As a result, a space is created between the parts 9a, 9b and the outer circumference of the wire, and the molding resin 6 inconveniently flows outside of the die.

Another problem results from difference in heat conductivity between the elastic lid plate 9 of the rubber material and the metal-made upper and lower molds 2, 3. That is, as the rubber material of the plate 9 is smaller in the heat conductivity than the metal-made molds, a part of the molding resin 6 contacting the plate 9 within the molding part 4 takes a longer time to be consumed for cooling and hardening than other parts therewithin, and this is delayed in releasing from the molds so much, taking a longer time and causing to lower productivity.

A further problem is, as apparently from FIG. 6, that one side (right side in the figure) of the molding part 4 is substantially perpendicular to the elastic lid plate 9, and a rear part of the terminal connecting portion covered thereat is naturally formed to be upright. Therefore, if the sheathed wire 7 is bent, peeling instantly starts at the rear part of the terminal connecting portion.

SUMMARY OF THE INVENTION

It is accordingly an object of the invention to provide a waterproofing apparatus for a terminal connecting portion of the sheathed wire effective to prevention of peeling a resin by improving a shape of a molding part as the molding cavity of the die which composes the essential parts of the apparatus so as to prevent leakage of the molding resin from the molding part, accelerating to cool and harden the molding resin for realizing to leave from the die at earlier period of time so as to improve productivity, and forming the rear part of the terminal connection to be a suitable shape after molding to cover the resin.

In order to achieve the above objects, according to the present invention, there is provided an apparatus for waterproofing a terminal connecting portion of a sheathed wire, in which a terminal fitting and a bare conductor of the sheathed wire are connected with each other, by molding with resin, the apparatus comprising:

an upper mold having an inner space which defines an upper part of a molding cavity in which the terminal connecting portion of the sheathed wire is accommodated and molten resin is injected therein;

a lower mold having an inner space which defines a lower part of the molding cavity;

an upper elastic lid member provided with the upper mold; and a lower elastic lid member provided with the lower mold, the upper and lower lid member elastically holding the sheathed wire therebetween when the connecting portion thereof is accommodated in the molding cavity, wherein the inner space of the upper mold and the inner space of the lower mold is respectively narrowed toward the upper lid member and the lower lid member such that the molding cavity in the vicinity of the connecting portion of the sheathed wire has a fusiform shape.

In the above configuration, since the resin pouring pressure may be low, the poured resin would not push the lid member from inside of the molding cavity. Therefore, since elastic deformation of the lid member can be suppressed, the molding resin can be prevented from getting out of the molding die.

Preferably, the narrowed portions of the upper and lower molds are provided with radiating fins in which a plurality of concave grooves and convex ribs are alternately arranged.

In the above configuration, since cooling at a portion near the elastic lid member is accelerated by the radiating fins, there can be solved a problem due to heat conductivity difference as described above.

Preferably, the most narrowed portions of the narrowed portions define an aperture having a diameter which is substantially as same as a diameter of the sheathed wire.

In the above configuration, since the thickness of the molded portion which contacts with the sheathed wire is made minimum, even if the sheathed wire is bent or flexed at that point, the peeling-off of the resin can be prevented.

According to the present invention, there is also provided a terminal connecting portion of a sheathed wire which is waterproofed by the waterproofing apparatus as described above. There can be provided a fusiform molded portion which covers and waterproofs the terminal connecting portion in which a terminal fitting and a bare conductor of the sheathed wire are connected with each other.

In the above configuration, even if the sheathed wire is bent or flexed at that point, the peeling-off of the resin can be prevented.

DETAILED DESCRIPTION OF THE PREFERRED EMBODIMENTS

The invention will be explained in detail with respect to embodiments of the waterproofing apparatus for the terminal connecting portion of the sheathed wire by way of the attached drawings.

Figure 1:
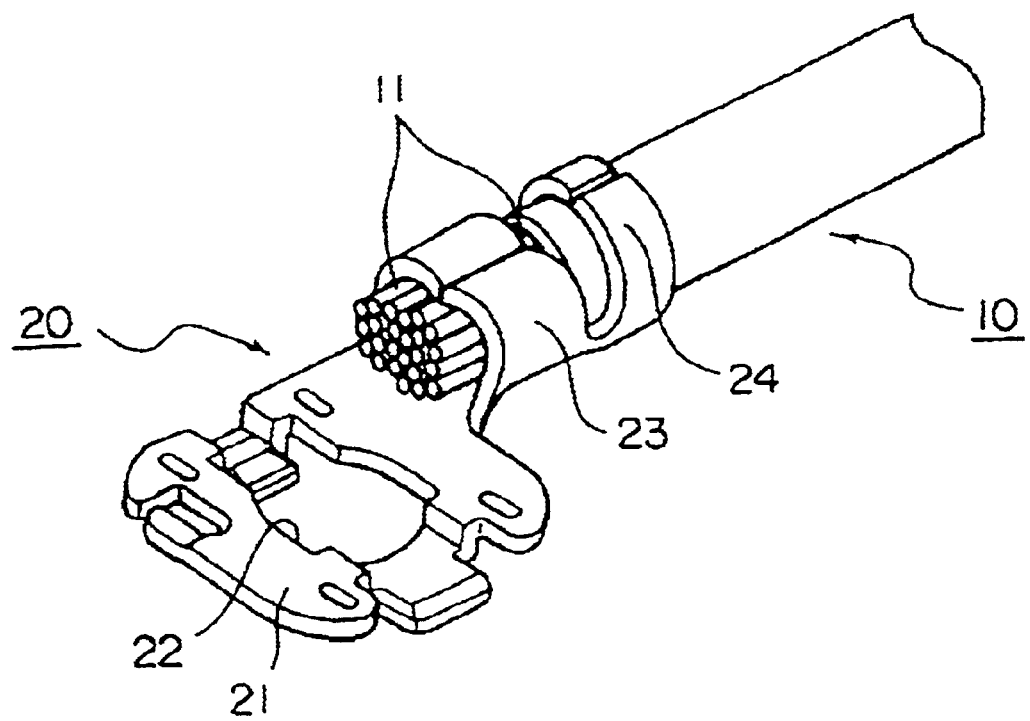
FIG. 1 is an perspective view showing a terminal connecting portion of a sheathed wire before waterproofing with molding resin.

FIG. 1 is a perspective view showing a terminal connecting portion before waterproofing, in which a front end part of the sheathed wire 10 is peeled off to expose a bare conductors 11 and a terminal fitting 20 is crimped thereon. A group of two pieces of wires shown in FIG. 2B is exemplified as the sheathed wire 10.

Figure 4:
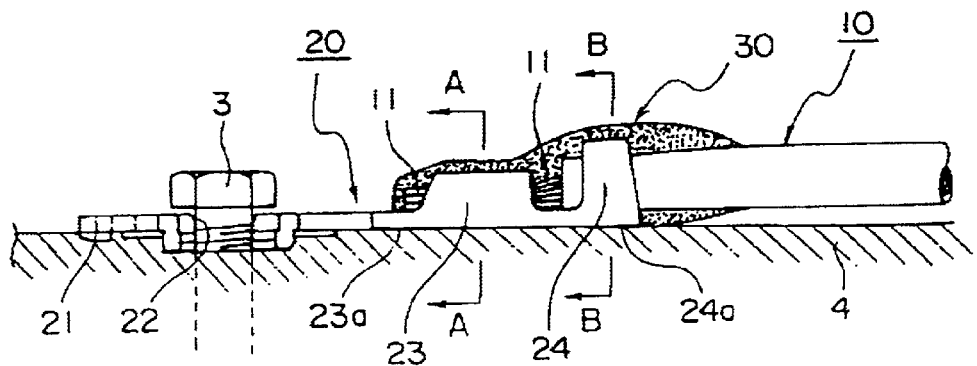
FIG. 4 is a side view showing, partially in cross section, showing a state that the waterproofed terminal connecting portion is fixed on a vehicle body.

The terminal fitting 20 has a connecting part 21 formed to be flat at the front portion, and as seen in FIG. 4, a bolt 3 is passed through an opening at a central part of the connection 21, so that the terminal fitting 20 serves as a ground line in a vehicle body. The connection 21 is formed to be caulking parts 23, 24 at the rear part for crimping to the bare conductors 11 to caulk the bare conductors 11.

Figure 2A:
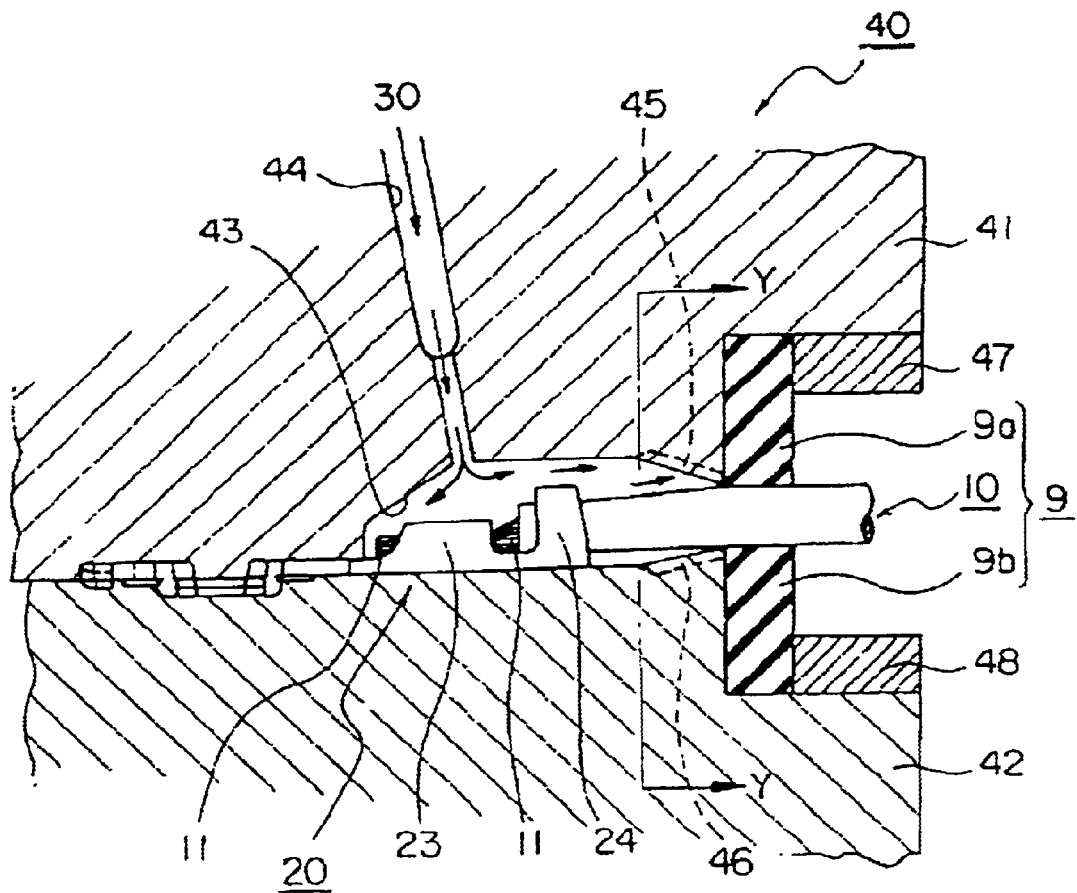
FIG. 2A is a sectional side view showing a state where the terminal connecting portion is set on a molding part of the molding die according to one embodiment of the invention.
Figure 2B:
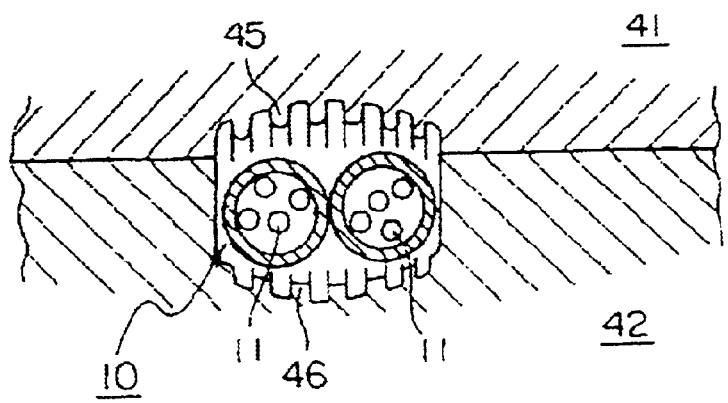
FIG. 2B is a sectional view taken along the line Y—Y of FIG. 2A.

FIGS. 2A and 2B show the molding die 40 of an essential part of the apparatus for setting such terminal connecting portions so as to carry out the waterproofing treatment, and essential parts thereof.

The molding die 40 comprises an upper mold 41 and a lower mold 42, which are provided at interior matching parts with a molding part 43 being a molding cavity. The molding die 40 has a runner channel 44 of an injecting gate for injecting to pour the molten molding resin shown with reference numeral "30" in the molding part 43. The molding part 43 faces the outside of the die at its one side, and this one side is closed with elastic lid plates 9a, 9b vertically opposite with respect to the upper mold 41 and the lower mold 42, said one side having been shown in FIG. 6 of the related example. The elastic lid plates 9a, 9b are held by respective clamps 47, 48.

FIG. 2B is a vertically cross sectional view seen from Y—Y line of FIG. 2A. At said one side of the molding part 43 facing the elastic lid plates 9a, 9b, radiating fins 45, 46 are defined which are elements of the invention. That is, said one side of the molding part 43 is formed at an inner part thereof with a tapered shape dividing into the upper mold 41 and the lower mold 42, and the tapered slope is formed with the radiating fins 45, 46 having a plurality of parallel alternate concave grooves and convex ribs. Diameters at front ends of a tapered hole formed with the radiating fins 45, 46 have sizes for the sheathed wire 10 being able to pass therethrough.

For waterproofing the terminal connecting portion, as shown in FIG. 2A, the terminal connecting portion is set to position the whole part thereof on the molding part 43 in such a shape, excepting the connecting part 21 of the front end of the terminal fitting 20. The part of the sheathed wire 10 extending rearwards of the terminal fitting 20 does not require the waterproofing treatment, and it is therefore projected outside of the die. This projecting part out of the radiating fins 45, 46 is elastically held by the elastic lid plates 9a, 9b of the upper and lower molds 41, 42.

After setting, the molten molding resin 30 is injected from the injecting gate, poured to the molding part 43 in the die through the runner channel 44, and is spread allover the interior of the molding part 43 and comes to the radiating fins 45, 46.

Since the radiating fins 45, 46 are tapered, a resin pouring force acting on the elastic lid plate 9a, 9b by the molding resin 30 reaching there is naught or minimum, and a force pressing the elastic lid plate 9a, 9b from the inside is controlled to be minimum. Therefore, the elastic lid plate 9a, 9b are scarcely elastic-deformed by the pouring force. The molding resin 30 contacts continuous concave grooves and convex ribs of the radiating fins 45, 46 and the resin becomes larger in the contacting area than a flat face, thereby effectively radiating heat to accelerate cooling and hardening so that viscosity is improved. Owing to a synergistic effect by the two actions of controlling the pressing force and increasing the resin viscosity, such inconvenience is dismissed that the molding resin 30 pushes aside the elastic lid plate 9a, 9b and gets out of the die.

Figure 6:
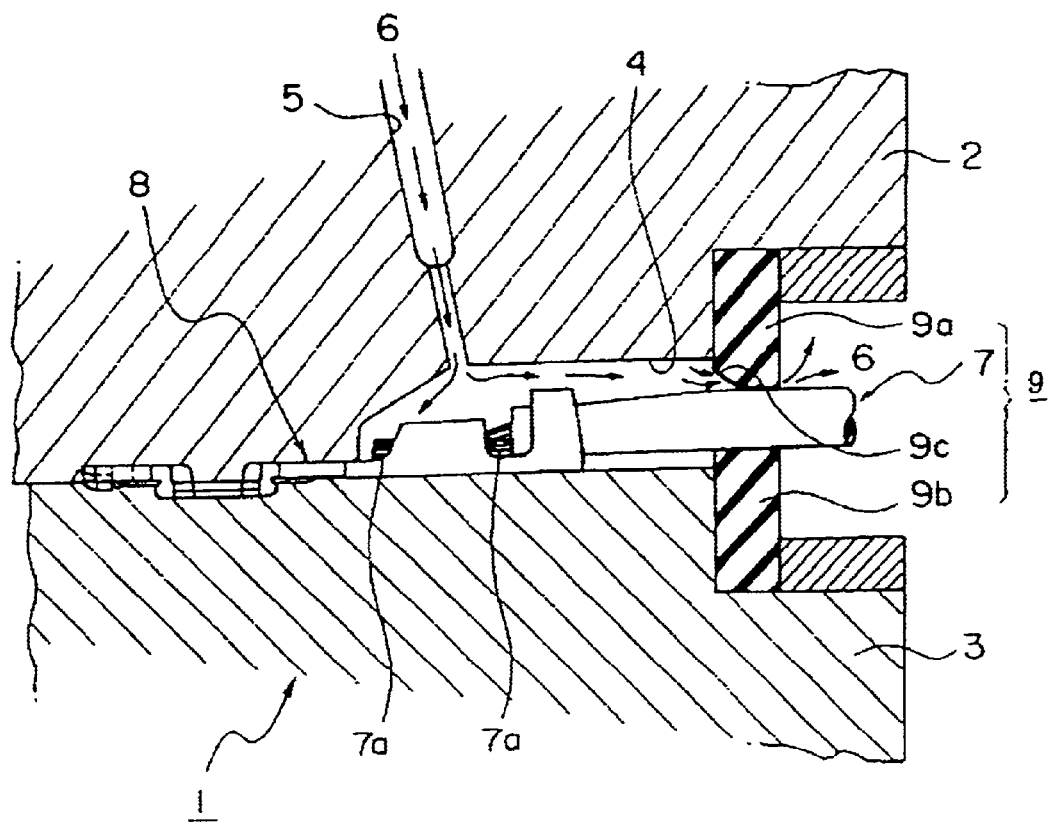
FIG. 6 is a sectional side view showing a state that the molten resin leaks from the elastic lid plate in the related molding die.

In the exemplified molding die 40, the disadvantage as in the related structure shown in FIG. 6 is compensated that the molding resin 6 directly contacts the plate 9a, 9b, so that the heat conductivity of the rubber material is smaller than that of the metal-made upper and lower molds 41, 42 and the melting temperature is difficult to go down. In short, if making almost equal in time the cooling of the part contacting the plate 9a, 9b of the molding resin 30 to other parts of the molding part 43, a mold release can be efficiently performed.

Figure 3:
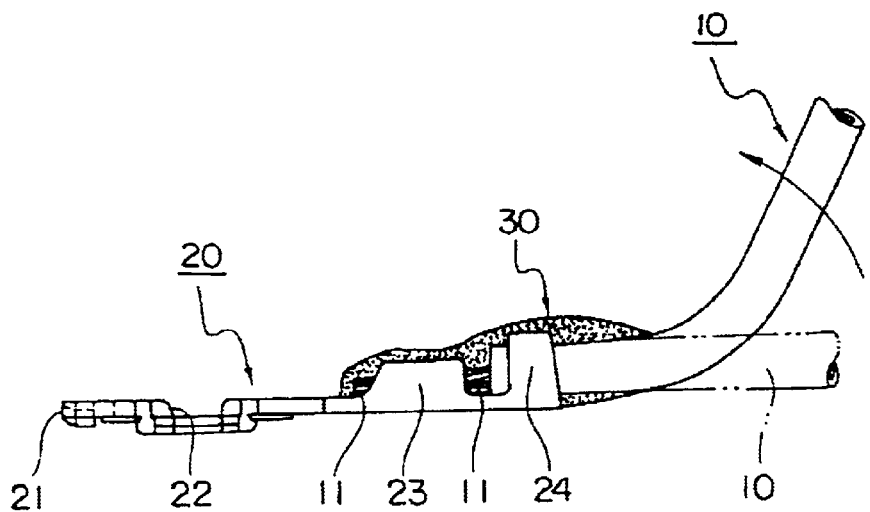
FIG. 3 is a side view showing, partially in cross section, the waterproofed terminal connecting portion.

As shown in FIG. 3, the terminal connecting portion waterproofed by the molding resin 30 is shaped as fusiform or cocoon as a whole following the shape of the radiating fins 45, 46 of tapered shape in the molding part 43. Being able to shape a fusiform brings about the following advantages. Thickness of the molding resin becomes thinner at the rear part of the taper shaped in fusiform, in other words, at the rear part of the terminal fitting 20, so that when the sheathed wire 10 is bent, this portion is extended and shrunk to easily follow the shape. The molding resin 30 is difficult to strip from the outer circumference of the sheathed wire so much, and the waterproofing capability can be maintained stable.

Figure 5A:
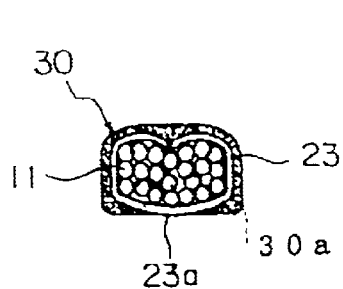
FIG. 5A is a sectional view taken along the line A—A of FIG. 4.
Figure 5B:
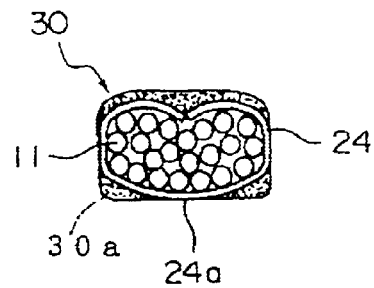
FIG. 5B is a sectional view showing taken along the line B—B of FIG. 4.

FIG. 4 is a side view showing, partially in cross section, a state where the terminal connection waterproof treated by the resin is connected as the earth cable to a vehicle body with, for example, a bolt 3. FIGS. 5A and 5B are front and cross sectional views respectively showing cross sections along A—A line and B—B line of FIG. 4.

As apparently from FIG. 4 and FIGS. 5A, 5B, in the terminal connecting portion waterproofed in the embodiment, the caulking parts 23, 24 of the bare conductors 11 at the front end of the sheathed wire 10 and the terminal fitting 20 are covered with the molding resin 30 almost allover the terminal connecting portion after the waterproofing treatment, excepting the connecting part 21 at the front end of the terminal fitting 20, and the desired waterproofing is treated.

The deposited molding resin 30 is not upheaved but uniform in any parts caulked by the caulking parts 23, 24 and also allover the bottom surfaces 23a, 24a of the caulked parts 23, 24. In short, the molding resin 30 is fully deposited to cover the three sides of the upper side and both sides of the terminal connecting portion, and a part of the molding resin 30a goes around both respective sides of the caulked bottom surfaces 23a, 24a. But thickness of such a part of the molding resin going around the bottom surface and deposited is a flat surface to an extent of not exceeding a highest part of the caulked bottom surfaces 23a, 24a.

Accordingly, as shown in FIG. 4, being under the condition that the caulking parts 23, 24 are mounted on the vehicle body 4, all the areas of the bottom surfaces 23a, 24a contact the upper surface of the vehicle body 4, so that any electrically conductive inferiority can be avoided between the connecting part 21 at the front end of the terminal fitting 20 and the vehicle body 4.

Herein, for the molding resin 30 as the sealing resin of high viscosity, in substitution for the related polyamide based hot melt brittle in the oil content as gasoline, the moisture hardening resin, specifically polyurethane hot melt is used as a molding compound.

The moisture hardening polyurethane hot melt disclosed in Japanese Patent Publication No. 10-511716A may be adopted. The melt viscosity is preferably 50 [Pa·s] or lower, more preferably 20 [Pa·s] or lower. The adhesive agent is substantially of non-solvent containing urethane radical. In addition, it is solid at room temperatures, and it is taken as an adhesive agent which is not only physically solidified by cooling after having been used in a melted form, but also solidified by chemical reaction between still existing isocyanate radical and moisture. The "moisture hardenability" means that polyurethane hot melt contains, more specifically silane and/or isocyanate radical generating chain extension reaction with water as a moisture in an air.

Namely, the present embodiment uses the moisture hardening polyurethane hot melt of viscosity 20 Pa·s as one example of the molding resin 30 by the sealing resin of high viscosity, and sets the melting temperature at injecting to be about 100° C. in the molding die 40. As mentioned above, the melting temperature at injecting in the molding die 40 can be determined to be low temperature as, for example, 100° C., and the injecting temperature as 100° C. is very low in comparison with 220° C. of polyamide based hot melt to be used in the related resin molding. By realizing it, operators of molding are released from working at high temperature and the labor burden is considerably lightened.

Even if the injecting temperature of the moisture hardening polyurethane hot melt of the present example is 100° C., this substance has the heat resistance to around 160° C. after the reaction (PuR-Hmi). This fact means that it is sufficiently adapted to use under high temperature circumstances as in vehicle engine rooms.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An apparatus for waterproofing a terminal connecting portion of a sheathed wire, in which a terminal fitting and a bare conductor at the sheatned wire are connected with each other, by molding with resin, The apparatus comprising:

an upper mold having an inner space which defines an upper part of a molding cavity in Which the terminal connecting portion of the sheathed wire is accommodated and molten resin is injected therein;

a lower mold having an inner space which defines a lower part of the molding cavity;

an upper elastic lid member provided with the upper mold; and a lower elastic lid member provided with the lower mold, the upper and lower lid member elastically holding the sheathed wire therebetween when the connecting portion thereof is accommodated in the molding cavity, wherein the inner space of the upper mold and the inner space of the lower mold is respectively narrowed toward the upper lid member and the lower lid member such that the molding cavity in the vicinity of the connecting portion of the sheathed wire has a fusiform shape.

2. The waterproofing apparatus as set forth in claim 1, wherein the narrowed portions of the upper and lower molds are provided with radiating fins in which a plurality of concave grooves and convex ribs are alternately arranged.

3. The waterproofing apparatus as set forth in claim 1, wherein the most narrowed portions of the narrowed portions define an aperture having a diameter which is substantially the same as a diameter of the sheathed wire.

* * * * *